United States Patent [19]
Watt et al.

[11] Patent Number: 5,654,551
[45] Date of Patent: Aug. 5, 1997

[54] METHOD AND APPARATUS FOR THE MEASUREMENT OF THE MASS FLOW RATES OF FLUID COMPONENTS IN A MULTIPHASE SLUG FLOW

[75] Inventors: John Stanley Watt, Heathcote; Henryk Wojciech Zastawny, Glenfield, both of Australia

[73] Assignee: Commonwealth Scientific and Industrial Research Organisation, Campbell, Australia

[21] Appl. No.: 341,597

[22] PCT Filed: May 20, 1993

[86] PCT No.: PCT/AU93/00232

§ 371 Date: Jan. 6, 1995

§ 102(e) Date: Jan. 6, 1995

[87] PCT Pub. No.: WO93/24811

PCT Pub. Date: Dec. 9, 1993

[30] Foreign Application Priority Data

May 22, 1992 [AU] Australia ................................. PL2571

[51] Int. Cl.$^6$ .................................................. G01F 1/00
[52] U.S. Cl. ................................. 250/356.1; 73/861.04; 378/51
[58] Field of Search ........................ 250/356.1; 378/51; 73/861.04

[56] References Cited

U.S. PATENT DOCUMENTS

| | | | |
|---|---|---|---|
| 4,205,230 | 5/1980 | Stubbs | 250/356.1 |
| 4,210,809 | 7/1980 | Pelavin et al. | 250/356.1 |
| 4,228,353 | 10/1980 | Johnson | 250/356.1 |
| 4,520,677 | 6/1985 | Macko et al. | 250/356.1 |
| 4,539,649 | 9/1985 | Michaelis et al. | 364/558 |
| 4,683,759 | 8/1987 | Skarsvaag et al. | 73/861.04 |
| 4,835,390 | 5/1989 | Blatchley et al. | 250/356.1 |
| 5,025,160 | 6/1991 | Watt | 250/356.1 |
| 5,121,639 | 6/1992 | McShane | 73/861.06 |
| 5,287,752 | 2/1994 | Den Boer | 73/861.04 |

FOREIGN PATENT DOCUMENTS

| | | |
|---|---|---|
| 3527489 | 1/1990 | Australia . |
| 0420109 | 4/1991 | European Pat. Off. . |
| 0465032 | 1/1992 | European Pat. Off. . |
| 2011621 | 7/1979 | United Kingdom . |
| 2182143 | 5/1987 | United Kingdom . |

OTHER PUBLICATIONS

J.S. Watt et al., "Progress Towards a Mass Flow Meter for Oil, Water and Gas", pp. 1–6 (1991), Offshore Australia Conference, Melbourne.
J.S. Watt et al., Nucl. Geophys., 5, No. 4, pp. 469–477 (1991), "Determination of Flow Velocity . . . Gamma–Ray Transmission".
M.D. Rebgetz et al., Nucl. Geophys., 5, No. 4, pp. 479–490 (1991), "Determination of the . . . Energy Gamma–ray Transmission".
Division G1 No. 1595973, "Flow Sensor", 21 Mar. 1978.
Division G1 No. 1340654, "Photoelectric fluid flowmeters", 30 May 1972.
Divisions 113 115, No. 1398381, "Correlation of noise–modulated signals", 2 Jun. 1972.

Primary Examiner—Carolyn E. Fields
Attorney, Agent, or Firm—Leydig, Voit & Mayer

[57] ABSTRACT

A method of measuring mass flow rates of liquid phases in a multiphase slug flow containing at least two liquid phases includes (i) passing a flow through a tube; (ii) detecting commencement of passage of a slug in the flow past a first location in the tube; (iii) measuring mass or volume fractions of the liquid phases by transmission of energy through the flow at the first location; (iv) detecting ending of the passage of the slug at the first location; and (v) determining mass flow rate of the liquid phases through the tube from (a) measuring the total mass or volume of liquid flowing through the tube and (b) measuring mass or flow fractions, only between detection of the commencement and the ending of passage of respective slugs in the flow, i.e., only while a slug is present at the measuring point.

25 Claims, 1 Drawing Sheet

METHOD AND APPARATUS FOR THE MEASUREMENT OF THE MASS FLOW RATES OF FLUID COMPONENTS IN A MULTIPHASE SLUG FLOW

TECHNICAL FIELD

This invention relates to measurement of fluid mass flowrates in a multiphase slug flow containing at least two liquid phases.

BACKGROUND ART

As used herein the term "phase" is intended to refer to separate immiscible liquid phases such as oil and water as well as liquid and gas phases. As used herein the term "multiphase" is intended to refer to a mixture including at least two such phases. The term "slug flow" refers to the slug or plug flow regime of the kind that occurs in pipelines from oil wells carrying the three-phase mixture of oil, water and gas. These flows are characterised by intermittent but well defined slugs of water, oil and gas mixtures which essentially fill the cross section of the pipeline. These slugs are separated by what are termed films, which are portions of the flow in which the pipeline is substantially filled with gas accompanied by a small amount of mixed water and oil.

The mass flow rate measurement of the oil, water and gas from individual oil wells is important for better reservoir management, better production allocation, and optimisation of total oil production over the field life. Normally, the required accuracy of determination of mass flow of each phase is 5%.

Additionally, there is often a need to measure the relative concentrations of oil and water in a flow after separation of the gas and some of the water. This measurement can present considerable practical difficulty particularly where the densities of the oil and water are the same or similar.

Current practice for the measurement of mass flowrate of the phases of oil well flows is to periodically physically divert the well output to a test separator. After separation the flow rate of each component is measured with conventional devices such as orifice or turbine flow meters. There are several inherent disadvantages associated with this technique. Firstly, accurate measurement requires stabilised well flow which can take some time to establish. Often, testing the output of a single well may take a whole day. In addition, the physical size of the separator and associated equipment occupies significant space which can lead to increased costs on off-shore platforms. Finally, in practice it is not feasible to provide each well with its own test separator system and often many wells share a common facility. Continuous monitoring of the output of each well is therefore not possible.

Various techniques have been suggested for on-line mass flow measurement of multiphase mixtures. Most depend on determination of the concentration of one or more of the phases coupled with a determination of either the mean velocity of one or more of the phases or the total mass flow of the mixture. Concentration measurement by capacitance is described in a paper entitled "On-line measurement of oil/water/gas mixtures using a capacitance sensor" by Beck M. S. Green R. G., Hammer E. A. and Thorn R., Measurement 3 (1) 7–14 (1985). Measurement of component concentration using a dual energy gamma-ray transmission technique has also been described by the following:

Fanger U., Pepelnik R. and Michaelis W.—Determination of conveyor-flow parameters by gamma-ray transmission analysis, pp. 539–550 in Nuclear Techniques and Mineral Resources 1977, IAEA, Vienna, 1977.

Michaelis W. and Fanger H. U.—Device for determining the proportions by volume of a multiple-component mixture, U.K. Patent Application GB2083908 A, 1982.

Abouelwafa M. S. A. and Kendall E. J. M.—The measurement of component ratios in multiphase systems using gamma-ray attenuation, J. Phys. E.: Sci. Instrum, 131 341–345 (1980).

Kendall E. J. M.—Gamma-ray analysis of multicomponent material, U.K. Patent Application GB 2088050 A, 1982.

Tomada T., Komaru M., Badono S., Tsumagari K. and Exall D.—Development of gamma-ray oil/water/gas fraction meter for crude oil production systems, Paper presented at the International Conference on Industrial Flow Measurement On-shore and Off-shore, 22–23/9/87, London.

Microwave measurement of phase concentration is also known from U.S. Pat. No. 4,301,400. Neutron inelastic scatter techniques have also been used.

Energy transmission techniques for measurement of phase concentration, in which the radiation source is on the opposite side of the pipe from the radiation detector, have the advantage over reflection or scatter techniques of being sensitive to fluid volumes right across the pipe and hence minimising the errors in determination of flow rate caused by heterogeneity of the three phase mixture. Transmission measurements can be based on the use of one, or the combination of more than one, of the following: gamma-rays, neutrons, microwaves, infrared or ultrasonics. Some transmission measurements require long radiation path lengths in oil and water to obtain adequate sensitivity for the determination of the oil and water volume and mass fractions. For this reason transmission techniques suffer loss of sensitivity in slug flow measurement since the liquid path length in the film between slugs is comparatively short.

DISCLOSURE OF THE INVENTION

It is an object of this invention to provide a method and apparatus for measurement of the mass flowrates of liquid phases in a multiphase slug flow containing at least two liquid phases which will overcome, or at least ameliorate, the above difficulty.

Accordingly, in a first aspect this invention consists in a method of measuring the mass flowrates of liquid phases in a multiphase slug flow containing at least two liquid phases, said method comprising the steps of:

(i) passing said flow through a tube;

(ii) detecting the commencement of the passage of a slug in the flow past a selected location in said tube;

(iii) measuring the mass or volume fractions of said liquid phases by energy transmission through said flow at said selected location;

(iv) detecting the end of the passage of said slug past said selected location; and (v) determining the mass flowrate of said liquid phases through said tube from a measurement of total mass or volume of liquid flowing through said tube and the measurements of mass or volume fractions made between detection of the respective commencements and ends of passage of slugs in the flow.

Preferably, step (v) further includes determining the mass flowrate of the gaseous phase.

In a second aspect this invention consists in an apparatus to measure the mass flowrates of liquid phases in a multiphase slug flow containing at least two liquid phases, said apparatus comprising:

(i) a tube through which said flow is passed;

(ii) first means to detect the commencement of the passage of a slug in the flow past a selected location in the tube;

(iii) transmission measuring means to measure the mass or volume fractions of said liquid phases by energy transmission through said flow at said selected location;

(iv) second means to detect the end of the passage of said slug past said selected location; and (v) calculating means responsive to said first, second and transmission measuring means to determine the mass flowrate of said liquid phases through said tube from both measurements of total mass or volume of liquid flowing through the tube and measurements of mass or volume fractions by said transmission measuring means made between detection of the respective commencements and ends of passage of slugs in the flow.

Preferably, the commencements and ends are respectively detected by the passage of the leading edge and trailing edge of a slug past the selected location.

Preferably also, the calculating means determines the mass flowrate of the gaseous phase.

The measurement of mass or volume fractions by energy transmission can utilise any appropriate energy or combinations of energies, for example, microwave, ultrasonic, infrared or gamma-ray energy. In one form, the measurement is made by utilising a dual energy gamma-ray technique described in U.S. Pat. No. 5,025,160 which is incorporated herein by reference. This technique provides for measurement of mass or volume fraction and by utilising two spaced apart dual energy transmission systems provides a measure of liquid flow velocity. Alternatively, two spaced apart single gamma-ray transmission systems are able to be used to determine the liquid velocity by cross-correlation of the gamma-ray intensities. Furthermore, the single gamma-ray transmission technique, which may be one of the dual energies of the above technique, can be used in the known manner to determine volume or mass flow of total liquid in the tube. Other techniques for determining total mass, volume and velocity of the total liquid flow are equally applicable for use in this invention.

The leading and trailing edges of the slugs can be determined by any suitable technique. Preferably, however, the same energy transmission technique is used to measure mass or volume fractions. The identification can be by way of a simple increase in the total mass per unit area of the flow at the selected location within the tube or by means of an appropriate pattern recognition algorithm. In either case, this identification is achieved by measuring the transmitted radiation at comparatively short time intervals. The use of short time intervals also allows the minimization of various errors produced during determination of mass or volume fractions resulting from the logarithmic relationship between volume or mass fraction

BRIEF DESCRIPTION OF THE DRAWINGS

One embodiment of the invention will now be described with reference to the accompanying drawing, FIG. 1, which is a schematic illustration of an apparatus according to this invention.

MODES FOR CARRYING OUT THE INVENTION

Figure 1:
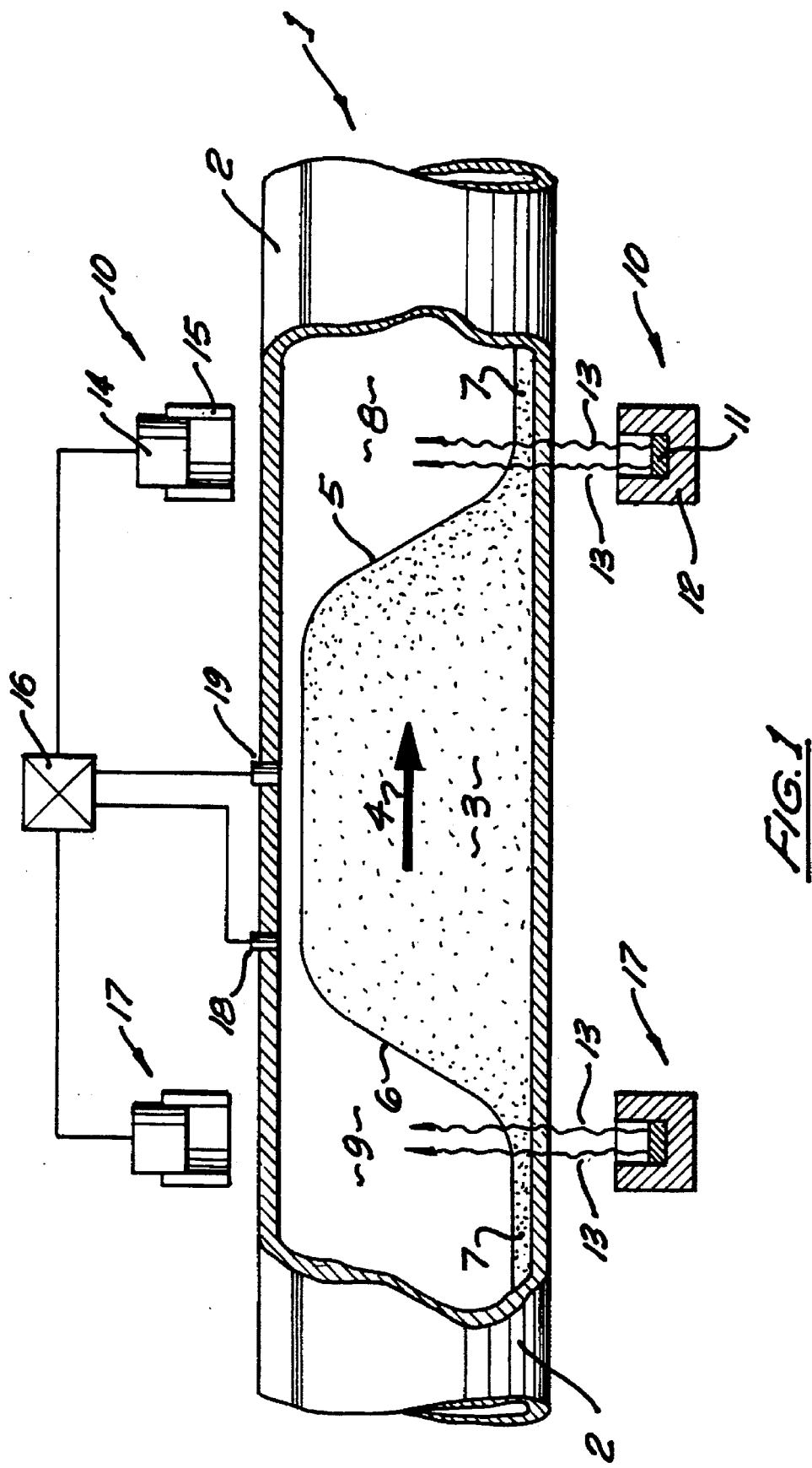

As shown in FIG. 1 a multiphase slug flow 1 is directed through a tube in the form of a pipeline 2. Slug flow 1 includes an oil, water and gas slug 3 travelling in the direction of arrow 4 and having a leading edge 5 and a trailing edge 6. Slug 3 is comprised of an oil, water and gas mixture and consecutive slugs are separated by a substantially oil and water film 7 and gas pockets 8 and 9.

A dual energy gamma-ray transmission gauge 10 of the type described in U.S. Pat. No. 5,025,160 comprises two radioisotope sources 11 for emitting gamma-rays 13 of two different energies. Alternatively, two separate sources are used. Sources 11 are contained within a shielded container 12 for providing a directionally limited emission of the gamma-rays. The radioisotope source used includes $^{241}$Am and one of the radioisotopes $^{137}$Cs, $^{133}$Ba and $^{60}$Co.

Gauge 10 also includes a gamma-ray detector in the form of a scintillation or solid state detector 14 which has a collimator 15 for collimating the gamma-rays and partly shielding the detector from scattered and background gamma-rays. The signals produced by detector 14 in response to the detected gamma-rays are transmitted to a processing computer unit 16 which determines the intensities of the gamma-rays at both energies.

A single energy gamma-ray transmission gauge 17 is disposed upstream of gauge 10 for providing processor 16 with additional data to allow the flow regime in pipeline 2 to be determined and the velocity of the flow obtained. The mass flow rates of oil, water and gas are subsequently determined by processor 16. Gauge 17 can be alternatively located downstream of gauge 10 and can be substituted with other appropriate energy sources and detectors. For example, in a further embodiment gauge 17 is a dual energy gamma-ray transmission gauge.

As described in the abovementioned U.S. Patent this measurement technique allows a determination of the mass or volume fractions of the liquids present in the beam. The detected gamma-ray counts are measured at short time intervals, of the order of 10 milliseconds and as such continuously updated determinations of mass and volume fractions are obtained.

The readings obtained from the spaced apart gauges allow processor 16 to identify the flow regime in pipeline 2 and, by subsequent use of the gamma-ray measurements, to sequentially determine:

(a) an approximation of the spatial distribution of liquids and gas over the whole cross-section of the pipe as a function of time;

(b) the velocities of the liquids of slug 3 and liquids of film 7 and the respective gases disposed in and above these liquids; and (c) the combining of (a) and (b) with measurements of temperature and pressure to calculate the total mass flow rates for the liquids and the gas in the gamma-ray beam.

The execution of step (b) is important due to the different velocities of the liquids in the slug and the film and the gas in the slug and above the film. The velocity of the slugs and film generally differ and relative variations of 10%–20% are commonly experienced.

At step (c) above the mass flow rate calculated for the liquid is that of the combined oil and water. In most applications this water is salt water, however, the invention can be easily adapted where fresh water is contained within the flow.

The invention provides for a determination of the mass ratio of oil to liquid by use of dual gamma-ray transmission gauge 10. Thereafter, the mass fractions of the liquid components, together with the previous calculated values obtained in steps (a), (b) and (c) above, are used to provide values of the volume or mass flow rates of the oil, water and gas in the slug flow.

Where more accurate values for the volume or mass flow rates are required, some compensation is used when determining the mass ratio of oil to liquid. In one form, this compensation includes accounting for the difference in density of the oil and water to enable a more accurate value of gas flow to be determined.

From the measurements obtained and the calculations performed processor 16 ensures that the determination of phase fractions are made only when the liquid transmission path length for gamma-rays 13 is at or near a maximum. Accordingly, the invention substantially eliminates the errors generated due to a short liquid transmission path lengths.

In one preferred embodiment the phase fractions are calculated between the passage of the leading and trailing edges 5 and 6 respectively through gamma-rays 13. For example, leading edge 5 can be detected by the observation of several consecutively increasing measurements of gamma-ray attenuation. Conversely, trailing edge 6 can be identified by several consecutively decreasing measurements of attenuation of gamma-rays 13. In this way, the volume or mass fractions of the liquid phases are determined from measurements made only during the times of passage of slug 3 through gamma-rays 13.

This measurement of the volume or mass fractions of the phases is then used to calculate the mass flowrates of oil, water and gas from measurements of velocity and total mass of liquids made in accordance with known techniques. These techniques can utilise the dual energy transmission arrangement described above or be made by suitable alternate techniques.

In other preferred embodiments, the leading and trailing edges are not used as above, but rather the gamma-ray counts are summed over several intervals. Once this sum falls below a predetermined level, values are obtained for mass and volume fractions.

In further embodiments, the mass flow rates of liquid phases are calculated at all times, however, the phase fractions of oil and water are determined only when the detected mass per unit area rises above a predetermined threshold. For example, this threshold may be set as the midpoint between the mass per unit area of a film and the mass per unit area of a slug. Furthermore, due to different slugs including a varying gaseous phase the mass per unit area between respective slugs will vary accordingly. Consequently, the threshold would, for example, be taken at the midpoint between the estimated average mass per unit area of the slugs and the film.

In a particular embodiment, the transmission means includes a dual gamma-ray source utilizing $^{241}$Am and $^{137}$Cs. The mass per unit area of the flow is determined from the $^{137}$Cs gamma-ray intensities for consecutive 10 millisecond time intervals. A predetermined threshold of mass per unit area, of say 4 g cm$^{-2}$, is established and if this threshold is exceeded in one of the time intervals the $^{241}$Am and $^{137}$Cs counts will be used to calculate the phase fractions of oil and water during that interval. That is, the determinations of phase fractions are made only when the liquid transmission path length is substantial. Adjustment of the threshold is possible to account for particular oil or flow characteristics and alternative length time intervals can be utilized, as required.

A further embodiment is configured substantially as set out in the preceding paragraph with the exception that for each ten millisecond time interval the mass per unit area figures obtained during the immediately preceding and subsequent 10 millisecond time intervals are averaged and compared to the threshold. Should this average exceed the threshold the phase fractions are calculated during the time interval of interest.

The decision to calculate the phase fractions during a time interval is able to be arrived at by one of a number of paths. The methods described above, although being preferred, are only some of the options available to those skilled in the art.

Preferably, the mass per unit area of the fluid in the gamma-ray beam is continuously calculated for consecutive time intervals from measurements of the transmission of the higher energy gamma-rays. This facilitates the identification of the flow regime which in turn allows the calculation of the average mass per unit volume of the flow over the cross-section of the pipe.

In this preferred embodiment, the disposition of gauge 17 upstream of gauge 10 and by cross-correlation of the respective measured gamma-ray intensities allows the velocity for the flow to be calculated from a knowledge of the time delay for the liquid to pass between the known distance between these gauges. Additionally, signals indicative of the pressure and temperature of the fluids in pipeline 2 are provided by sensor means 18 and 19 respectively and subsequently transmitted to processor 16 to allow the calculation of the specific gravities of the liquids and the solubilities of the gas in both the water and oil. The variation of the specific gravities and the gas solubilities with temperature and pressure are obtained from prior laboratory testing.

It is preferred that pipeline 2 includes a section manufactured from a material of lower effective atomic number than iron. For example, metals such at Al or Mg, an alloy thereof, or composite materials such as carbon fibre or glass fibre. Such a section will generally be a length of pipeline 2, however, in alternative embodiments the pipeline includes two opposed windows through which the gamma-rays pass.

The foregoing describes only some embodiments of the invention and modifications can be made thereto without departing from the scope of the invention. For example, although pipeline 2 is illustrated in a horizontal configuration the invention will perform adequately when the pipe is maintained in a vertical configuration or inclined at an angle therebetween.

We claim:

1. A method of measuring mass flow rates of liquid phases in a multiphase slug flow containing at least two liquid phases, said method comprising:

(i) passing a flow through a tube;
   (ii) detecting commencement of passage of a slug in the flow past a first location in said tube;
   (iii) measuring mass or volume fractions of the liquid phases by transmitting energy through the flow at the first location;
   (iv) detecting ending of the passage of the slug past the first location; and
   (v) determining mass flow rate of the liquid phases through said tube from (a) the measuring of total mass or volume of liquid flowing through said tube and (b) the measuring of mass or flow fractions, only between detection of the commencement and the ending of passage of respective slugs in the flow.

2. The method of claim 1 including detecting the commencement and the ending of the passage of respective slugs by detecting the passage of a leading edge and a trailing edge of respective slugs past the first location.

3. The method according to claim 1 including transmitting energy through the flow from a source of gamma rays.

4. The method according to claim 3 including transmitting energy through the flow from a dual energy gamma-ray source.

5. The method according to claim 1 including monitoring temperature, pressure, and velocity of the flow for determining the mass flow rates of the liquid phases.

6. The method according to claim 5 including determining the velocity from respective signals indicative of mass per unit area of the flow at the first location and at a second location spaced upstream from the first location.

7. The method according to claim 6 including cross-correlating the signals indicative of mass per unit area from the first and second locations for determining the velocity.

8. The method according to claim 6 wherein a dual energy gamma-ray transmission gauge is disposed at the first location and a single energy gamma-ray transmission gauge is disposed at the second location for providing the signals.

9. The method according to claim 2 including detecting the leading and trailing edges of slugs using the energy transmitted through the flow to measure the mass or volume fractions.

10. The method according to claim 2 including detecting the leading and trailing edges by respectively detecting a plurality of consecutively increasing or consecutively decreasing masses or volumes of the flow.

11. The method according to claim 1 including determining the mass for each of a plurality of consecutive time intervals and determining the mass or volume fractions of the liquid phases when the mass of the flow exceeds a threshold.

12. The method according to claim 1 including determining the mass for each of a plurality of consecutive time intervals and determining the mass or volume fractions of the liquid phases for a first time interval when an average of the mass obtained for a time interval immediately preceding the first time interval and for time intervals subsequent to the first time interval exceeds a threshold.

13. The method according to claim 1 wherein step (v) further includes measuring pressure and temperature of the flow and continuously determining the mass flow rate of a gaseous phase.

14. An apparatus for measuring mass flow rates of liquid phases in a multiphase slug flow containing at least two liquid phases, said apparatus comprising:

(i) a tube through which a flow passes;

(ii) first means for detecting commencement of passage of a slug in the flow past a first location in said tube;

(iii) transmission measuring means for measuring mass or volume fractions of the liquid phases by transmitting energy through the flow at the first location;

(iv) second means for detecting ending of the passage of a slug past the first location; and (v) calculating means responsive to said first, second, and transmission measuring means for determining mass flow rate of the liquid phases through said tube from (a) measuring total mass or volume of liquid flowing through said tube and (b) measuring mass or flow fractions by said transmission measuring means, only between detection of the commencement and the ending of passage of respective slugs in the flow.

15. The apparatus according to claim 14 wherein said first and second means detect a leading edge and a trailing edge, respectively, of a slug flowing past the first location.

16. The apparatus according to claim 14 wherein said transmission measuring means measures attenuation of the energy transmitted through the flow and including a source of gamma rays as an energy source.

17. The apparatus according to claim 16 including a dual energy gamma-ray source as a source of the energy.

18. The apparatus according to claim 14 including first and second sensor means for providing signals to said calculating means indicative of temperature and pressure of the flow.

19. The apparatus according to claim 14 wherein said transmission measuring means provides said calculating means with a signal indicative of velocity of the flow.

20. The apparatus according to claim 19 including a single energy gamma-ray transmission gauge wherein said transmission measuring means includes a dual energy gamma-ray transmission gauge disposed downstream of said single energy gamma-ray transmission gauge.

21. The apparatus according to claim 15 wherein the leading and trailing edges of slugs are detected from the energy transmitted to measure the mass or volume fractions.

22. The apparatus according to claim 15 wherein detection of the leading and trailing edges includes detecting a plurality of consecutively increasing or consecutively decreasing masses or volumes for the flow.

23. The apparatus according to claim 14 wherein the mass of the flow is determined for each of a plurality of consecutive time intervals, the mass or volume fractions of the liquid phases being determined when the mass of the flow exceeds a threshold.

24. The apparatus according to claim 14 wherein the mass of the flow is determined for each of a plurality of consecutive time intervals, the mass or volume fractions of the liquid phases being determined during a first time interval when an average of the mass obtained during a time interval immediately preceding the first time interval and time intervals subsequent to the first time interval exceeds a threshold.

25. The apparatus according to claim 14 including first and second sensor means for respectively determining pressure and temperature of the flow, said calculating means continuously determining a mass flow rate of a gaseous phase of the flow.

* * * * *